(No Model.) 5 Sheets—Sheet 1.

W. MILLS & S. L. DAVIS.
AUTOMATIC TILE CUT-OFF.

No. 537,808. Patented Apr. 16, 1895.

Fig. 1.

Witnesses
C. H. Olds,
Geo. O. Willet

Inventors
Wellington Mills and
Samuel L. Davis
by W. M. Monroe
Attorney.

(No Model.) 5 Sheets—Sheet 2.

W. MILLS & S. L. DAVIS.
AUTOMATIC TILE CUT-OFF.

No. 537,808. Patented Apr. 16, 1895.

Witnesses
C. H. Olds,
Geo. O. Willet

Inventors
Wellington Mills
and Samuel L. Davis
by Wm. M. Monroe
Attorney.

(No Model.) 5 Sheets—Sheet 3.

W. MILLS & S. L. DAVIS.
AUTOMATIC TILE CUT-OFF.

No. 537,808. Patented Apr. 16, 1895.

Witnesses.
C. H. Olds.
Geo. O. Willet.

Inventors
Willington Mills
and Samuel L. Davis
by Wm. M. Monroe.
Attorney (No Model.) 5 Sheets—Sheet 4.
W. MILLS & S. L. DAVIS.
AUTOMATIC TILE CUT-OFF.
No. 537,808. Patented Apr. 16, 1895.
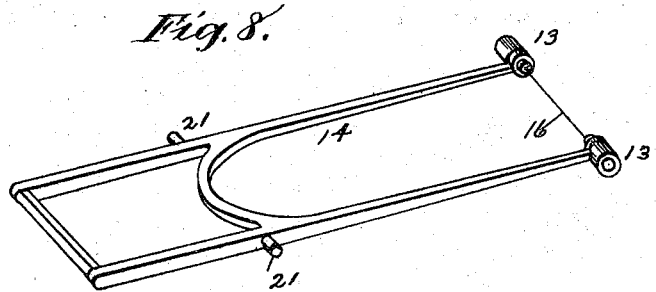
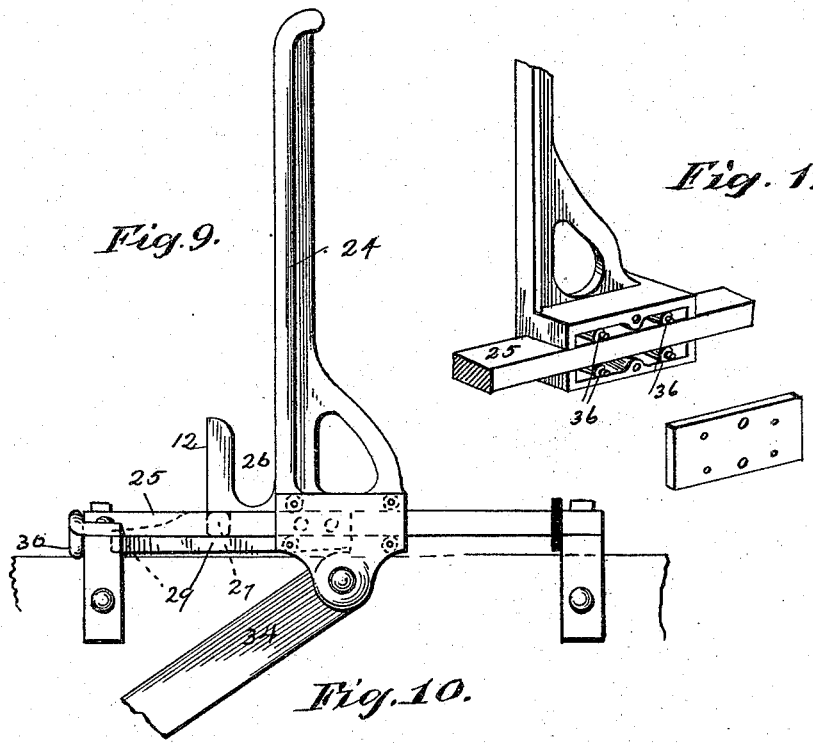
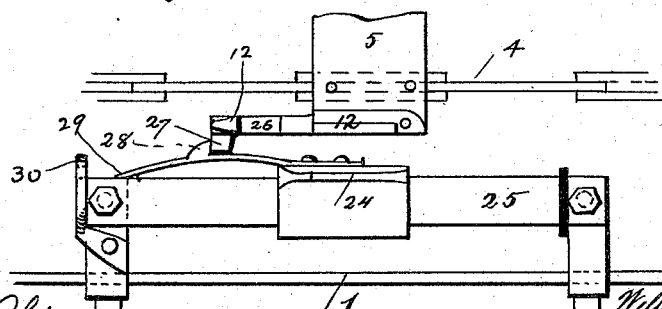

(No Model.) 5 Sheets—Sheet 5.

W. MILLS & S. L. DAVIS.
AUTOMATIC TILE CUT-OFF.

No. 537,808. Patented Apr. 16, 1895.

Witnesses
C. H. Olds,
Geo. O. Willet

Inventors
Wellington Mills
Samuel L. Davis
by Wm. N. Monroe
Attorney

UNITED STATES PATENT OFFICE.

WELLINGTON MILLS, OF SHILOH, AND SAMUEL L. DAVIS, OF PLYMOUTH, OHIO.

AUTOMATIC TILE CUT-OFF.

SPECIFICATION forming part of Letters Patent No. 537,808, dated April 16, 1895.

Application filed November 19, 1894. Serial No. 529,284. (No model.)

*To all whom it may concern:*

Be it known that we, WELLINGTON MILLS, residing at Shiloh, and SAMUEL L. DAVIS, residing at Plymouth, county of Richland, State of Ohio, citizens of the United States, have invented certain new and useful Improvements in Automatic Tile Cut-Offs, of which we hereby declare the following to be a full, clear, and exact description, such as will enable others skilled in the art to which it appertains to make and use the same.

Our invention relates to improvements in automatic cut-offs for tile machines, of the class in which a revolving reel cut-off is associated with a conveyer actuated by the weight of the column of tile material, and the objects of the invention are to provide means for giving rigidity and positive movement to the cutting edges, to insure sharp and accurate division of the tile from the column, and to admit the location of the machine closely against the feeder.

Our invention consists in the improved driving chain and wheel and low platform drivers, with the double wheel disk and detachable cutting arms, and in the construction of bed-plate, and combination and arrangement of the various parts as hereinafter described, shown in the accompanying drawings, and more specifically pointed out in the claims.

Figure 2:
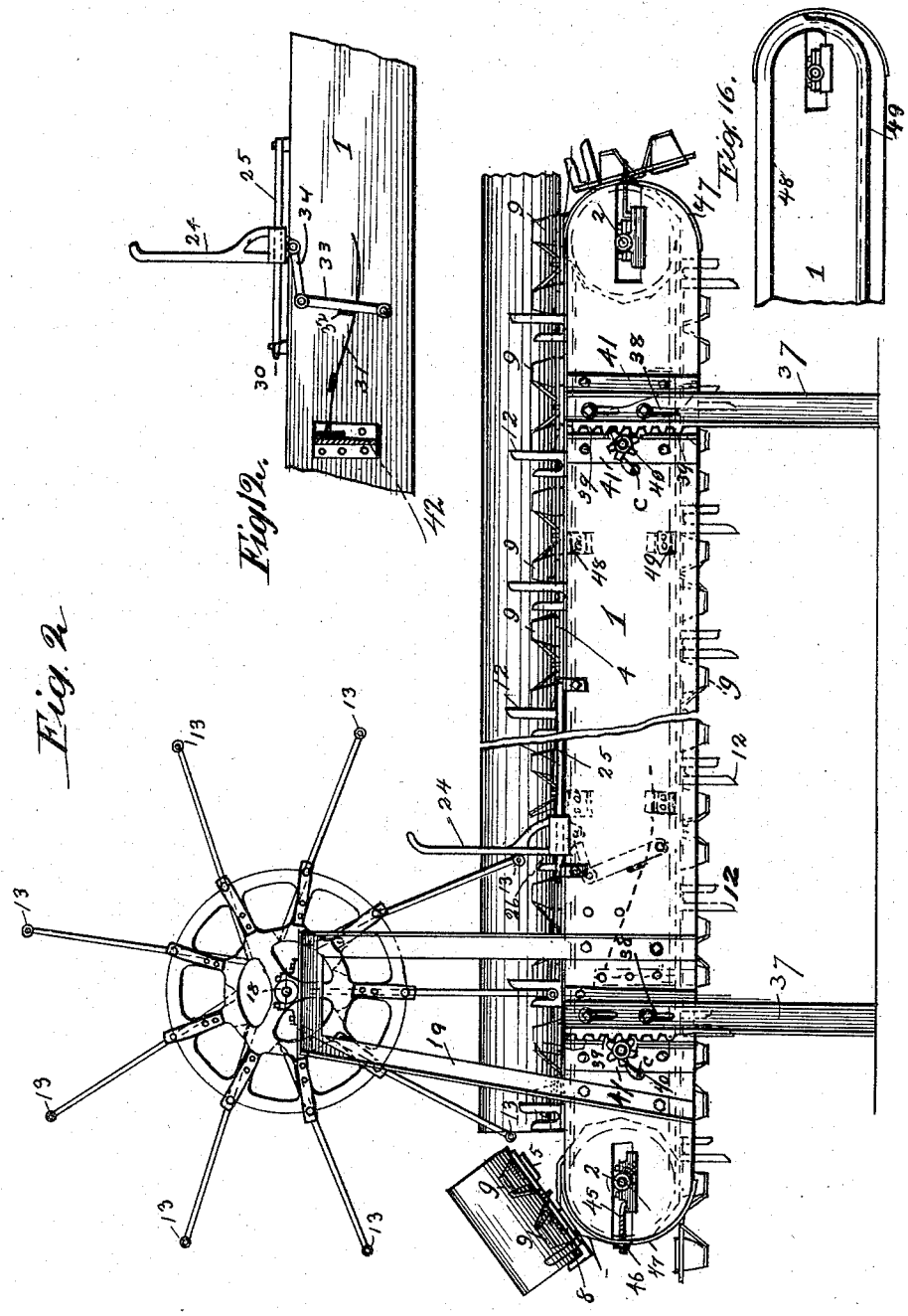
Figure 3:
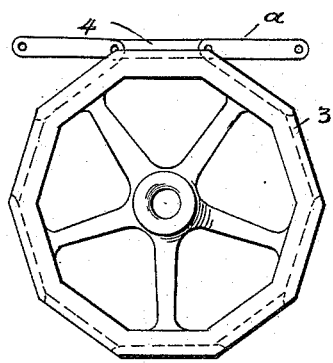
Figure 4:
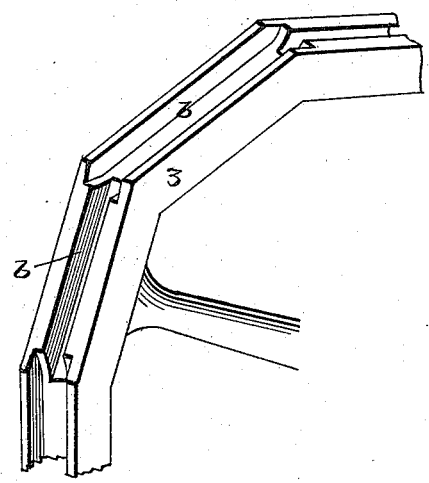
Figure 5:
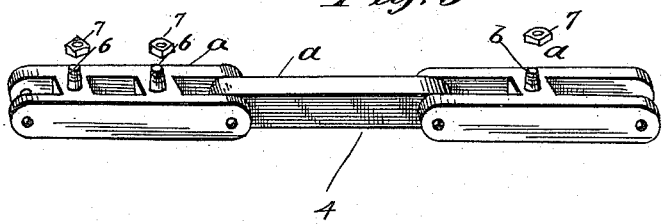
Figure 6:
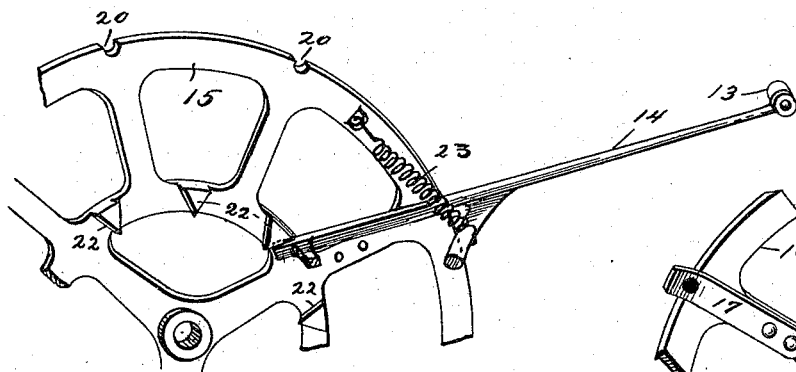
Figure 7:
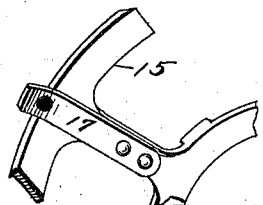
Figure 13:
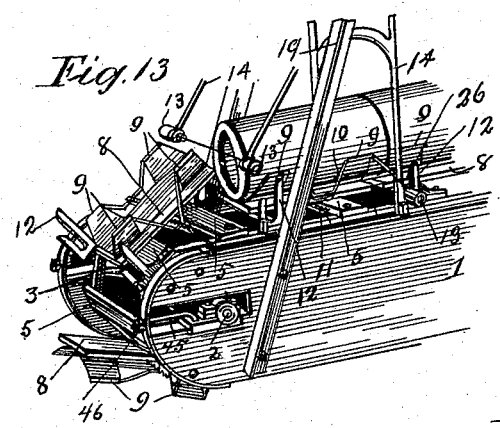
Figure 14:
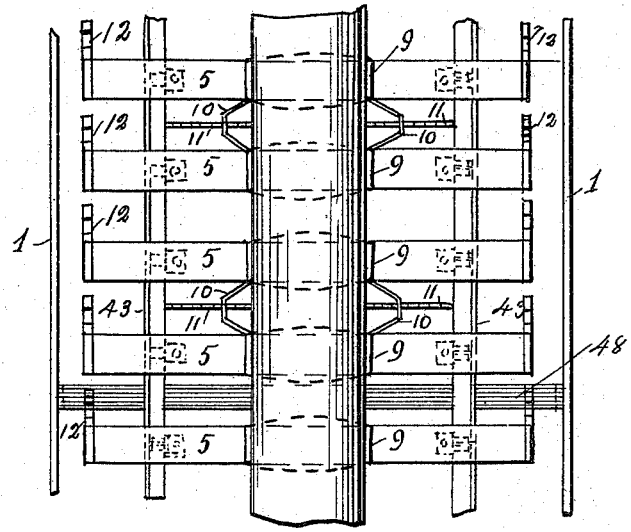
Figure 15:
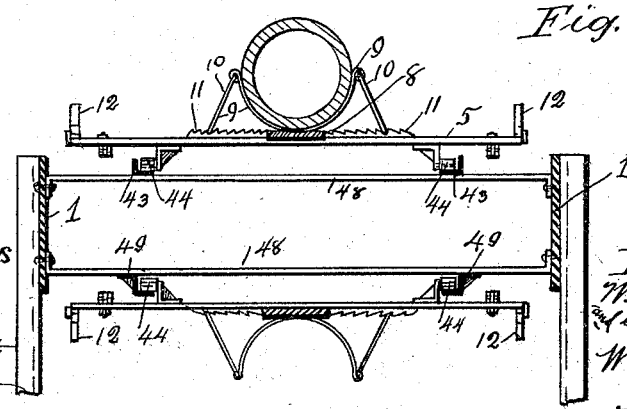

In the accompanying drawings, Figure 1 is a perspective view of the machine. Fig. 2 is a side elevation of same. Fig. 3 is a side elevation of sprocket wheel and drive chain. Fig. 4 is a detail of part of rim of wheel. Fig. 5 is a detail of chain. Fig. 6 is a detail of rim of disk with a portion of cutting arm. Fig. 7 is a detail of retaining spring on disk. Fig. 8 is a detail view of one of the cutting arms. Fig. 9 is a side elevation of the guide for cutting arm. Fig. 10 is a plan view of the same with adjacent parts. Fig. 11 is a detail view of guide with cover removed to show roller bearings. Fig. 12 is a side elevation of guide and actuating spring. Fig. 13 is a perspective view of the delivery extremity of the conveyer. Fig. 14 is a plan view of a portion of the machine, and Fig. 15 is a transverse section. Fig. 16 is a longitudinal section of frame taken vertically between the ends.

In the figures 1 is a bed plate supporting in roller bearings 2, at either extremity the sprocket driving wheel 3, carrying the endless chain 4, the links (*a*) of which accurately fit, in corresponding channels (*b*) of the wheels so as to move without jar or vibration. Upon this chain are mounted the cross bars 5 secured to the double links by threaded projections 6 and nuts 7. Longitudinal bars 8 are secured upon alternate pairs of the cross bars, and are provided with curved holders 9 for the tile column. These longitudinal bars 8 are secured in each case to the forward bar of the pair of horizontal bars so that as the bars pass over the forward wheel the forward bar will be canted first, and the rear end of the tile will be thrown up and away from contact with the revolving cutters, as in Fig. 13. It has been found that without long links and a sprocket wheel of ten sides giving the angle of movement shown complete escape from the cutters cannot be obtained.

The curved holders 9 are adjustable for size of arc, by means of the braces 10 and rack bars 11 which securely hold them to the diameter of the column.

At either end of the cross bar to which each longitudinal bar is secured, are attached the low drivers 12 which engage the rollers 13 upon the cutting arms 14 and revolve the disk 15 and arms 14, thus driving the cutting wires 16 in turn through the column.

The cutting arms 14 are detachably pivoted in spring bars 17 upon the edges of the pair of disks 15, which are mounted upon the shaft bearings 18 upon the standards 19 at the forward end of the machine. Semi-circular bearings 20 receive the pivot pins 21 of the cutter arms on the edges of the disks which are so placed as to nearly balance the arm 14. These arms swing loosely upon their pivots between the stops 22 circularly arranged on the inner faces of the disks. Springs 23 normally hold the arms back to give the position of the wires for entering the column and prevent any jar or vibration which would otherwise be caused by the arm striking the stops as the disks revolve, while free vibration to and from the vertical is permitted during the cut.

Since it would be inconvenient to make the drivers 12 long enough to act as vertical guides for the cutting wire rollers, and at the same time as drivers, separate guides, 24 are provided mounted on either side of the machine upon bars 25 and having a short forward movement in unison with the adjacent driver 12, until each roller on the cutting wire is deposited in the open slot 26 in the driver arranged to engage it, when the function of the vertical guide being over, it is quickly withdrawn by automatic mechanism.

In Figs. 9, 10 and 11 are shown views of the vertical guide.

In the plan view 27 is a lug secured to the outer side of the driver 12 adapted to engage the spring catch 28 secured to the vertical guide 24. It will be seen that the vertical guide will be thus drawn along with the driver at the time one of the cutting arms and the attached rollers are ready to descend as in Fig. 2. The rollers will then descend vertically and the arm tip on its pivots until the rollers reach the drivers, when the vertical arm will be at the end of its forward movement and the extremity of the spring 29 will be inserted under the hook 30 on the bar 25 and the catch be withdrawn so as to release the guide. It is then returned by a spring of any desirable form, as shown in Fig. 12. The flat spring 31 bearing on the cross bar 32 connecting the arms 33 on each side of the machine, serves to throw back both guides which are connected with the said arms by links 34 and pivot pins 35. In Fig. 11 rollers 36 are inserted in the guide to bear upon the bar 25 and reduce the friction to a minimum.

The frame of the machine is designed of steel to be as light and at the same time as rigid as possible. The supports are four legs of channel bar steel 37, slotted at 38, for vertical adjustment to the height of the auger machine. For quick adjustment a rack 39 is secured to one edge of the leg and a pinion 40 engaging the rack can be used to raise or lower the leg, which moves in guides 41. The end of the pinion shaft is squared to permit the use of a wrench to turn the pinion. Transverse beams 42 connect the side pieces and bars 43 support the chain conveyers, the rollers 44 traveling thereon along the top of the machine. At each end of the machine is seen an adjustment for the endless chain where 45 is a rod entering the bearing and adjustably secured by the nut 46 in the strap 47 passing over the end of the machine.

The construction of the frame and supports for the conveyer are clearly seen in Figs. 14, 15 and 16, where 43 are longitudinal bars upon which the rollers 44 bear. These bars are supported on cross pieces 48 riveted to the side bars of the machine, as many being employed as are necessary to support the weight of the tile and conveyer. In order to support the conveyer while it passes underneath the frame, and lessen the friction upon the end bearings, the longitudinal bars 49 are employed separated from the upper bars sufficiently to permit the rollers to be transferred thereto. The lower bars are Z shaped as shown in Fig. 15 and the rollers run upon the lower flange. The gain in reduction of friction obtained thereby is very great.

The advantages of this device are obviously great for a number of reasons, viz:—In the first place the form of chain and wheel with long bearing facets serve to increase the angle of the tip as the tile is separated from the body of the column, and so gives ample room for the wire cutter to pass upward without shearing off a corner of the tile, while the fitting of the links into the wheel insures positive and accurate movement; again, the short carriers permit the auger machine or the tile mill, to be placed close against the sprocket wheel and so avoid any buckling or sagging in the plastic column, on delivery, without extra support. Furthermore the rigid support for each cut off arm between two disks, enables the cutting action to be positive, without danger of twisting or side action, while the simple spring attachments enable the arms to be removed at pleasure; and no bolts or other fastenings will be required. Again the central method of pivoting the arms gives a short quick sweep to the wires and prevents cutting the edges of the tile in rising.

Having described our invention, what we claim as new, and desire to secure by Letters Patent, is—

1. In a cut-off machine for plastic materials, the combination with a rigid frame of decagonal sprocket wheels adjustably pivoted at either end of said frame, endless chains connecting said wheels, cross bars secured to alternate links of said chains, longitudinal bars secured to alternate cross bars, low driving uprights secured to the ends of said alternate cross bars, provided with lateral lugs, long vertical guides mounted upon longitudinal bars at the sides of the chains provided with spring mechanism adapted to engage said lugs, means for detaching and for reversing the movement of the said long vertical guides, and pivoted arms provided with cutting wires and rollers, mounted removably between rotating disks, substantially as described.

2. In a cut off machine for plastic materials, the combination with a rigid frame supporting sprocket wheels at either end, of a chain conveyer provided with short vertical drivers mounted upon said sprocket wheels, disks mounted upon a shaft above said conveyers and provided with cutting arms removably pivoted upon the edges thereof, cutting wires and rollers upon said arms, stops for the arms upon the disks, and guides for the rollers independent from the short drivers, substantially as set forth.

3. In a cut-off for plastic material, a pair of disks mounted upon a central shaft, in combination with arms removably pivoted upon the outer edges of said disks in spring bars, and adapted to oscillate freely between said disks, stops upon the disks at the inner extremities of the arms limiting the said movement, and rollers and wire cutters at the outer extremities of the arms, substantially as described.

4. In a cut off machine, the combination with an endless conveyer, of transverse bars on said conveyer, short roller drivers on the said transverse bars provided with lateral lugs, a long vertical guide at each side of the conveyer sliding upon a longitudinal bar, a spring catch upon each guide adapted to engage the said lugs, a hook at the extremity of each longitudinal bar, adapted to release said spring catch, and spring mechanism whereby the guides may be returned when at the limit of their movement, substantially as described.

5. In a tile cutting machine, an endless conveyer, consisting of cross bars mounted upon chain links, at either end, said links being separated by intermediate links, in combination with a radial cutter adapted to revolve over said conveyer, provided with cutting wires, and decagonal sprocket wheels adapted to give positive movement to the conveyer and tip the cross bar and longitudinal bar supporting the tile at such an angle as to immediately free the tile from the cutting wire, substantially as described.

WELLINGTON MILLS.
SAMUEL L. DAVIS.

Witnesses:
WM. M. MONROE,
GEO. O. WILLET.